| (12) | United States Patent | (10) Patent No.: | US 8,092,928 B2 |
|---|---|---|---|
| | Schofalvi et al. | (45) Date of Patent: | Jan. 10, 2012 |

(54) REINFORCED CERAMIC REFRACTORY

(75) Inventors: Karl-Heinz Schofalvi, Solon, OH (US); Evelyn McGee DeLiso, Cleveland, OH (US)

(73) Assignee: Stanton Advanced Ceramics, Inc., Cleveland, OH (US)

( * ) Notice: Subject to any disclaimer, the term of this patent is extended or adjusted under 35 U.S.C. 154(b) by 278 days.

(21) Appl. No.: 12/399,510

(22) Filed: Mar. 6, 2009

(65) Prior Publication Data

US 2009/0233784 A1 Sep. 17, 2009

Related U.S. Application Data

(60) Provisional application No. 61/035,427, filed on Mar. 11, 2008.

(51) Int. Cl.
*B32B 9/00* (2006.01)
*B32B 19/00* (2006.01)
*C04B 35/00* (2006.01)

(52) U.S. Cl. ........ 428/699; 428/689; 428/701; 428/702; 501/153

(58) Field of Classification Search ........... 428/688, 428/689, 697, 699, 701, 702; 501/127, 153
See application file for complete search history.

(56) References Cited

U.S. PATENT DOCUMENTS

| 3,899,444 A | 8/1975 | Stephens | 252/455 |
|---|---|---|---|
| 3,982,955 A | 9/1976 | Mansmann et al. | 106/307 |
| 3,993,572 A | 11/1976 | Hindin et al. | 252/462 |
| 4,528,279 A | 7/1985 | Suzuki et al. | 502/200 |
| 4,753,902 A * | 6/1988 | Ketcham | 501/87 |
| 4,837,230 A | 6/1989 | Chen et al. | 501/88 |
| 4,839,402 A | 6/1989 | Stevens | 523/200 |
| 4,935,296 A | 6/1990 | Stevens | 428/381 |
| 5,006,423 A | 4/1991 | Draskovich | 428/698 |
| 5,071,679 A * | 12/1991 | Heraud et al. | 427/264 |
| 5,126,087 A | 6/1992 | Lespade et al. | 264/136 |
| 5,294,387 A | 3/1994 | Nakano et al. | 156/89.26 |
| 5,340,655 A | 8/1994 | Creber et al. | 428/446 |
| 5,378,665 A | 1/1995 | Chen et al. | 501/95.1 |
| 5,422,331 A | 6/1995 | Calligan et al. | 502/333 |
| 5,488,017 A | 1/1996 | Szweda et al. | 501/95.2 |
| 5,490,977 A | 2/1996 | Wan et al. | 423/210 |
| 5,609,741 A | 3/1997 | Illston et al. | 204/471 |
| 5,635,454 A | 6/1997 | Baker et al. | 595/434 |
| 5,656,217 A | 8/1997 | Rogers et al. | 264/640 |

(Continued)

OTHER PUBLICATIONS

Claussen, N. and G. Petzow, Whisker-reinforced zirconia-toughened ceramics. Tressler, Messing, Pantano & Newnham, Eds. Tailoring of Multiphase and Composite. (pp. 649-662). Plenum Publishing Corp., 1986.

(Continued)

*Primary Examiner* — Jerry Lorengo
*Assistant Examiner* — Noah Wiese
(74) *Attorney, Agent, or Firm* — Renner, Otto, Boisselle & Sklar, LLP

(57) ABSTRACT

The disclosed invention relates to a reinforced ceramic refractory made from an as-batched composition comprising alumina; a rare earth oxide; an oxide of a transition metal comprising Sc, Zn, Ga, Y, Cd, In, Sn, Tl or a mixture of two or more thereof; and chopped ceramic fibers containing nanofibrils; the refractory exhibiting a modulus of rupture measured at 2500° F. (1371° C.) of at least about 2500 psi, as determined by the test method ASTM C583. A process for making the reinforced ceramic refractory is disclosed.

14 Claims, 7 Drawing Sheets

U.S. PATENT DOCUMENTS

| | | | | |
|---|---|---|---|---|
| 6,030,910 | A | 2/2000 | Zoitos et al. | 501/36 |
| 6,291,058 | B1 * | 9/2001 | Goujard et al. | 428/293.4 |
| 6,497,776 | B1 | 12/2002 | Butler et al. | 156/89.11 |
| 7,081,294 | B2 * | 7/2006 | Schofalvi et al. | 428/325 |
| 7,488,544 | B2 | 2/2009 | Schofalvi et al. | 428/701 |
| 2003/0022783 | A1 | 1/2003 | DiChiara | 501/127 |
| 2005/0181193 | A1 * | 8/2005 | Lenke et al. | 428/293.4 |

OTHER PUBLICATIONS

Mazdiyasni, K.S. Fiber Reinforced Ceramic Composites. (pp. 1-39, 93-109, 122-140, 182-192, 328-341, and 434). William Andrew Publishing/Noyes, 1990. Online version available at: http://www.knovel.com/knovel2/Toc.jsp?BookID=364&VerticalID=0.

Almatis Premium Alumina; "Cements & Binders"; www.almatis.com/refractor/applications/cements-and-binders.aspx; Nov. 15, 2007.

Almatis Premium Alumina; Data Sheets & MSDS; www.almatis.com/data-sheets; Nov. 15, 2007.

Almatis Premium Alumina; Alphabond 300 Material Safety Data Sheet; May 31, 2007; pp. 1-6.

3M; "3M™ Nextel™ Ceramic Fiber," Product Literature; www.3m.com/product/information/Nextel-Ceramic-Fiber.html; Nov. 15, 2007.

3M; Nextel™, Ceramic Textiles Technical Notebook, pp. 1-47. (Publication Date Unknown but Admitted as Prior Art).

Buhr et al.; "Almatis Global Product Concept for the Refractory Industry"; (Publication Date Unknown but Admitted as Prior Art).

McConnell et al.; "Raw Materials for Non-Complex High Performance Low Cement Castables"; (Publication Date Unknown but Admitted as Prior Art).

Hurley et al.; "Subtask 6.4—Improved Corrosion Resistance for Alumina Refractory"; Final Topical Report for the period Apr. 15, 1998 through Apr. 30, 1999; Apr. 1999.

Wilson et al.; "High Performance Oxide Fibers for Metal and Ceramic"; Presented at the Processing of Fibers & Composites Conference, Barga, Italy, May 22, 2000.

* cited by examiner

REINFORCED CERAMIC REFRACTORY

This application claims priority under 35 U.S.C. §119(e) to U.S. Provisional Application Ser. No. 61/035,427 filed Mar. 11, 2008. The disclosure in this provisional application is incorporated herein by reference.

TECHNICAL FIELD

This invention relates to reinforced ceramic refractories and to a process for making the reinforced ceramic refractories.

BACKGROUND

The high temperatures experienced with molten metals in the aluminum and steel industries typically require the use of ceramic refractories that are placed in contact with the molten metals.

SUMMARY

A problem in the art relates to providing ceramic refractories which have high use temperatures that exhibit high hot modulus of rupture (MOR) values and are resistant to penetration by molten metals such as aluminum and steel. This invention provides a solution to this problem. This invention relates to a reinforced ceramic refractory that may be characterized by a unique microstructure. The inventive reinforced ceramic refractory may be characterized by a number of surprising and important properties including high hot MOR values, high cold crushing strength, and a fine surface porosity which renders the refractory resistant to molten metal penetration. This refractory may be used at temperatures up to about 1850° C.

This invention relates to a reinforced ceramic refractory made from an as-batched composition comprising: alumina; a rare earth oxide; an oxide of a transition metal comprising Sc, Zn, Ga, Y, Cd, In, Sn, Tl or a mixture of two or more thereof; and chopped ceramic fibers containing nanofibrils; the refractory exhibiting a modulus of rupture measured at 2500° F. (1371° C.) of at least about 2500 psi, as determined by test method ASTM C583. The inventive reinforced refractory may exhibit a cold crushing strength of at least about 8000 psi, or at least about 13,000 psi, as determined by the test method ASTM C133.

This invention further relates to a process for making a reinforced ceramic refractory, comprising: wetting chopped ceramic fibers with an acidic solution for an effective period of time to form wetted chopped ceramic fibers containing nanofibrils; mixing the wetted chopped ceramic fibers with alumina particulates, particulates of an oxide of a transition metal comprising Sc, Zn, Ga, Y, Cd, In, Sn, Tl, or a mixture of two or more thereof, and particulates of a rare earth oxide to form an as-batched composition; and heating the as-batched composition at a sufficient temperature and for an effective period of time to form the reinforced ceramic refractory. In one embodiment, the as-batched composition further comprises alumina aggregate. The heating step may comprise drying the as-batched composition, and then heating or firing the as-batched composition to form the inventive reinforced ceramic refractory. The heating or firing step may be referred to as a sintering step.

DETAILED DESCRIPTION

Figure 1:
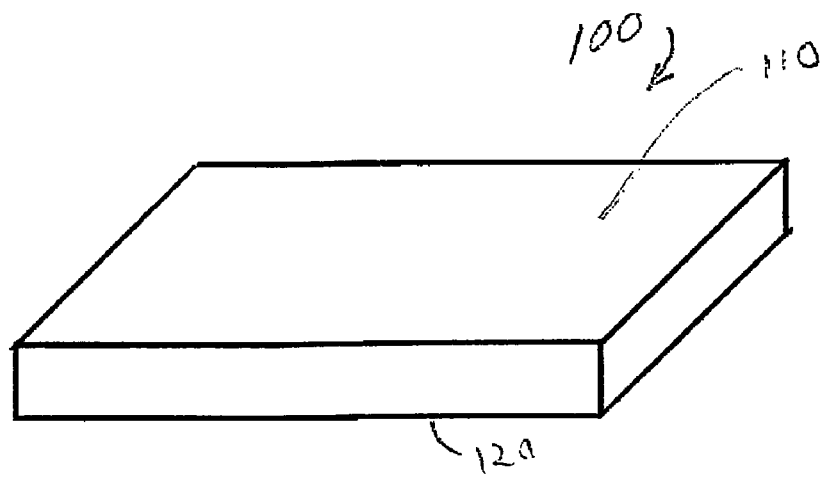
FIG. 1 is a schematic illustration of a sheet of reinforced ceramic refractory within the scope of the invention.

All ranges and ratio limits disclosed in the specification and claims may be combined in any manner. It is to be understood that unless specifically stated otherwise, references to "a", "an", and/or "the" may include one or more than one, and that reference to an item in the singular may also include the item in the plural.

The term "chopped ceramic fiber" refers to short lengths of ceramic fiber made by cutting a continuous ceramic fiber roving. The chopped fibers may be uniform in length and diameter. The lengths may be in the range from about 0.1 to about 5 cm, and in one embodiment from about 0.3 to about 4 cm. The diameters may be in the range from about 1 to about 50 microns, and in one embodiment from about 1 to about 30 microns, and in one embodiment from about 1 to about 20 microns, and in one embodiment from about 3 to about 15 microns, and in one embodiment from about 7 to about 13 microns, and in one embodiment about 10 microns.

The term "nanofibril" refers to fibrils extending from the surface of the chopped ceramic fibers. The nanofibrils may have mean diameters in the range from about 0.1 to about 2000 nanometers (nm), and in one embodiment in the range from about 1 to about 1000 nm, and in one embodiment in the range from about 5 to about 500 nm, and in one embodiment in the range from about 10 to about 100 nm. The nanofibrils may have mean lengths in the range from about 1 to about 10,000 nm, and in one embodiment in the range from about 10 to about 5000 nm, and in one embodiment in the range from about 50 to about 2500 nm, and in one embodiment in the range from about 100 to about 1000 nm.

The inventive reinforced ceramic refractory is made from an as-batched composition which comprises alumina, chopped ceramic fibers containing nanofibrils, one or more rare earth oxides, and one or more oxides of a transitional metal, the transition metal being Sc, Zn, Ga, Y, Cd, In, Sn, Tl or a mixture of two or more thereof. The alumina may be in the form of alpha-alumina. The as-batched composition may be dried and then heated or fired at a sufficient temperature for an effective period of time to make the inventive reinforced ceramic refractory. The term "as-batched" refers to the composition used to make the inventive reinforced ceramic refractory prior to heating or firing.

The rare earth oxide may be an oxide of Pr, La, Ce, Nd, Pm, Sm, Eu, Gd, Tb, Dy, Ho, Er, Tm, Yb, Lu, or a mixture of two or more thereof. Pr is useful. The rare earth oxide as introduced into the batch before heating or firing (that is, as-batched) may comprise $Pr_6O_{11}$. The rare earth oxide may function as a non-wetting agent in the inventive reinforced ceramic refractory and may be employed at an effective concentration to function as refractory enhancer. The concentration of the rare earth element in the inventive reinforced ceramic refractory may be in the range from about 0.1 to about 40% by weight, and in one embodiment in the range from about 1 to about 30% by weight, and in one embodiment in the range from about 3 to about 20% by weight, and in one embodiment in the range from about 6 to about 14% by weight.

As indicated above, the transition metal may comprise Sc, Zn, Ga, Y, Cd, In, Sn, Tl, or a mixture of two or more thereof. Y is useful. The transition metal oxide may comprise $Y_2O_3$. The transition metal oxide may function as a binding agent for the refractory. The concentration of the transition metal in the inventive reinforced ceramic refractory may be an effective amount to function as a binding agent for the refractory. The concentration of the transition metal in the inventive reinforced ceramic refractory may be in the range from about 0.01 to about 20% by weight, and in one embodiment in the range from about 0.01 to about 10% by weight, and in one embodiment in the range from about 0.05 to about 5% by weight, and in one embodiment in the range from about 0.1 to about 2% by weight.

The inventive reinforced ceramic refractory may be formed in any desired shape depending upon its intended use. The inventive refractory may be used in high temperature applications wherein high impact resistance is required. These may include furnace wall linings for use in processing molten metals and glass. These may include slide gates, tundish lances, and various castable shapes such as cones and mill rolls for use in the iron, steel, aluminum and glass industries. The inventive reinforced ceramic refractories may be used in fuel cells, such as for use in making insulator plates, reformer box housings, and the like. The inventive refractories may be useful as electric kiln tiles, and the like. The inventive reinforced ceramic refractories may be used as catalyst supports for hot (for example, temperatures up to about 1600° C.) gaseous process (for example, removal of particulates, sulfur, NOx, and the like, from exhaust gas streams), filter mediums for hot (for example, temperatures up to about 1200° C.) gaseous separations, and the like.

The inventive reinforced ceramic refractories may be formed in shapes that include density gradients. These shapes may include one side wherein the density is relatively low, for example, in the range from about 1.5 to about 3.0 $g/cm^3$, and in one embodiment in the range from about 2.2 to about 2.5 $g/cm^3$, and another side wherein the density is relatively high, for example, in the range from about 4 to about 5 $g/cm^3$, and in one embodiment in the range from about 4.2 to about 4.5 $g/cm^3$. These shapes may exhibit a density gradient extending over part or all of the distance from the one side to the other side. The density gradient may be in the range from about 1 to about 3 $g/cm^3$ per centimeter of length, and in one embodiment in the range from about 1.2 to about 1.8 $g/cm^3$ per centimeter of length. These shapes may include one side wherein the porosity is relatively low, for example, in the range from about 4 to about 10%, and in one embodiment in the range from about 6 to about 8%, and another side wherein the porosity is relatively high, for example, in the range from about 25 to about 40%, and in one embodiment in the range from about 28 to about 35%. These shapes may exhibit a porosity gradient extending over part of all of the distance from the one side to the another side. The porosity gradient may be in the range from about 10 to about 40% per centimeter of length, and in one embodiment in the range from about 20 to about 30% per centimeter of length.

The density and porosity differences and gradients may be established by proportionately varying the concentration of particulate alumina in the composite mixture as the composite mixture is placed in a mold prior to drying. For example, as illustrated in FIG. 1, the inventive refractories may be formed into rectangular sheets 100 which may be used as furnace linings for furnaces used for processing molten metal. The rectangular sheet 100 includes a first surface 110 which may have a relatively low density (for example, in the range from about 1.5 to about 3 $g/cm^3$, and in one embodiment about 1.8 $g/cm^3$) and a second surface 120 which may have a relatively high density (for example, in the range from about 4 to about 5 $g/cm^3$, and in one embodiment about 4.2 $g/cm^3$). When used in a furnace containing molten metal, the low-density side 110 may be adhered to the walls of the furnace while the high density side 120 may be exposed to the molten metal. The low density side 110 may exhibit a relatively high porosity (as compared to the high density side 120) and this high porosity may be used to enhance adhering the sheet 100 to the walls of the furnace using a cement or an adhesive that penetrates the pores of the low density side 110. The high density side 120 may exhibit a relatively low porosity and thus may be less vulnerable to molten metal penetration than the low density side 110.

The inventive reinforced ceramic refractory may exhibit a hot modulus of rupture (MOR) measured at 2500° F. (1371° C.) of at least about 2500 psi, and in one embodiment in the range from about 2500 to about 5000 psi, and in one embodiment in the range from about 2600 to about 4000 psi, as determined by the test method ASTM C583.

The inventive reinforced ceramic refractory may exhibit a hot MOR measured at 1500° F. (816° C.) in the range from about 3000 to about 10000 psi, and in one embodiment in the range from about 4300 to about 6200 psi, as determined by the test method ASTM C583.

The inventive reinforced ceramic refractories may exhibit sufficient cold crushing strength to permit extended use in high-impact applications such as in molten metal or glass processing wherein high levels of impact can be expected. The inventive reinforced ceramic refractory may exhibit a room temperature cold crushing strength of at least about 8000 psi, and in one embodiment at least about 13000 psi, and in one embodiment in the range from about 8000 to about 40000 psi, and in one embodiment in the range from about 13000 to about 40000 psi, as determined by the test method ASTM C133.

The inventive reinforced ceramic refractories may be sufficiently abrasion resistant to permit extended use in high temperature applications such as in molten metal or glass processing wherein high levels of abrasive wear can be expected. The inventive refractories may exhibit abrasion loss values in the range from about 3 to about 18, and in one embodiment in the range from about 7 to about 12 cc, as determined using test method ASTM C704. These values are in terms of grams (g) of sample weight loss per bulk density of the sample, that is, g/g/cc=cc. The term "cc" refers to cubic centimeters.

The inventive reinforced ceramic refractory may exhibit a thermal diffusivity in the range from about 0.02 to about 0.005 $cm^2$/sec, and in one embodiment in the range from about 0.05 to about 0.007 $cm^2$/sec, as determined by the test method ASTM E1461.

The inventive reinforced ceramic refractory may exhibit a thermal conductivity in the range from about 0.01 to about 0.02 W/cm° K, and in one embodiment in the range from about 0.05 to about 0.03 W/cm° K.

The inventive reinforced ceramic refractory may exhibit a specific heat capacity in the range from about 0.8 to about 1.4 Cp/(J/g° K), and in one embodiment in the range from about 1.1 to about 1.3 Cp(J/g° K), as determined by the test method ASTM E1269.

The inventive reinforced ceramic refractory may exhibit a bulk density in the range from about 3 to about 3.5 g/cm$^3$, and in one embodiment in the range from about 3.1 to about 3.3 g/cm$^3$, as determined by the test method ASTM C134.

The inventive reinforced ceramic refractory may exhibit a difference in modulus of rupture (MOR) between uncycled specimens and specimens subjected to thermal cycling in the range from about 400 to about 8000 pounds per square inch (psi), and in one embodiment in the range from about 4400 to about 5500 psi, as determined by the test method ASTM C1171.

The inventive reinforced ceramic refractory may exhibit a room temperature modulus of rupture (MOR) in the range from about 5000 to about 9000 psi, and in one embodiment in the range from about 6500 about 8000 psi, as determined by the test method ASTM C133.

The inventive reinforced ceramic refractory may exhibit an apparent porosity in the range from about 5 to about 45% by weight, and in one embodiment in the range from about 20 to about 30% by weight, as determined by the test method ASTM C20.

The inventive reinforced ceramic refractory may exhibit a specific gravity in the range from about 3.2 to about 5.0, and in one embodiment in the range from about 3.9 to about 4.2, as determined by the test method ASTM C20.

The process for making the inventive reinforced ceramic refractory may comprise wetting chopped ceramic fibers with an acidic solution for an effective period of time to form wetted chopped ceramic fibers containing nanofibrils; mixing the wetted chopped ceramic fibers with alumina particulates, particulates of one or more oxides of a transition metal comprising Sc, Zn, Ga, Y, Cd, In, Sn, Tl or a mixture of two or more thereof, particulates of one or more rare earth oxides and, optionally, alumina aggregate, to form an as-batched composition; and drying the as-batched composition and then heating or firing the as-batched composition at a sufficient temperature and for an effective period of time to form the reinforced ceramic refractory.

The chopped ceramic fibers may comprise strands of ceramic fiber that are chopped to median lengths in the range from about 0.1 to about 5 cm, and in one embodiment in the range from about 0.3 to about 4 cm. The chopped ceramic fibers may have median diameters in the range from about 1 to about 50 microns, and in one embodiment from about 1 to about 30 microns, and in one embodiment in the range from about 1 to about 20 microns, and in one embodiment in the range from about 3 to about 15 microns, and in one embodiment in the range from about 7 to about 13 microns, and in one embodiment about 10 microns. The chopped ceramic fibers may have an alumina content of at least about 95% by weight, and in one embodiment at least about 97% by weight, and in one embodiment at least about 99% by weight. The alumina may comprise alpha-alumina, gamma-alumina, eta-alumina, rho-alumina, delta-alumina, theta-alumina, or a mixture of two or more thereof. The chopped ceramic fibers may have a concentration of gamma alumina crystallinity of at least about 50% by weight, and in one embodiment in the range from about 50 to about 99.9% by weight, and a concentration of alpha alumina crystallinity that is up to about 5% by weight, and in one embodiment in the range from about 0.1 to about 5% by weight. Upon sintering the alumina that is not alpha-alumina may convert to alpha-alumina.

The chopped ceramic fibers may be wetted with an acidic solution for an effective period of time to provide for the desired level of nanofibril formation on the surface of the chopped fibers. The acidic solution may comprise a protonic acid such as $HNO_3$ and distilled water. The acidic solution may further comprise one or more dispersing agents. An example of a useful dispersing agent may be Darvan C which is a product of R. T. Vanderbilt identified as an ammonium polymethacrylate dispersing agent. The acidic solution may have an acid concentration in the range from about 0.1 to about 4% by weight, and in one embodiment from about 2.8 to about 3.2% by weight. The acidic solution may contain from about 0.01 to about 2% by weight dispersing agent, and in one embodiment from about 0.4 to about 0.8% by weight dispersing agent. The wetted fibers may be formed by contacting the chopped ceramic fibers with the acidic solution using any suitable contacting method including dripping, spraying, dipping, immersing, and the like. The contacting may be effected over a period in the range from about 1 to about 100 minutes, and in one embodiment from about 40 to about 60 minutes.

Figure 2:
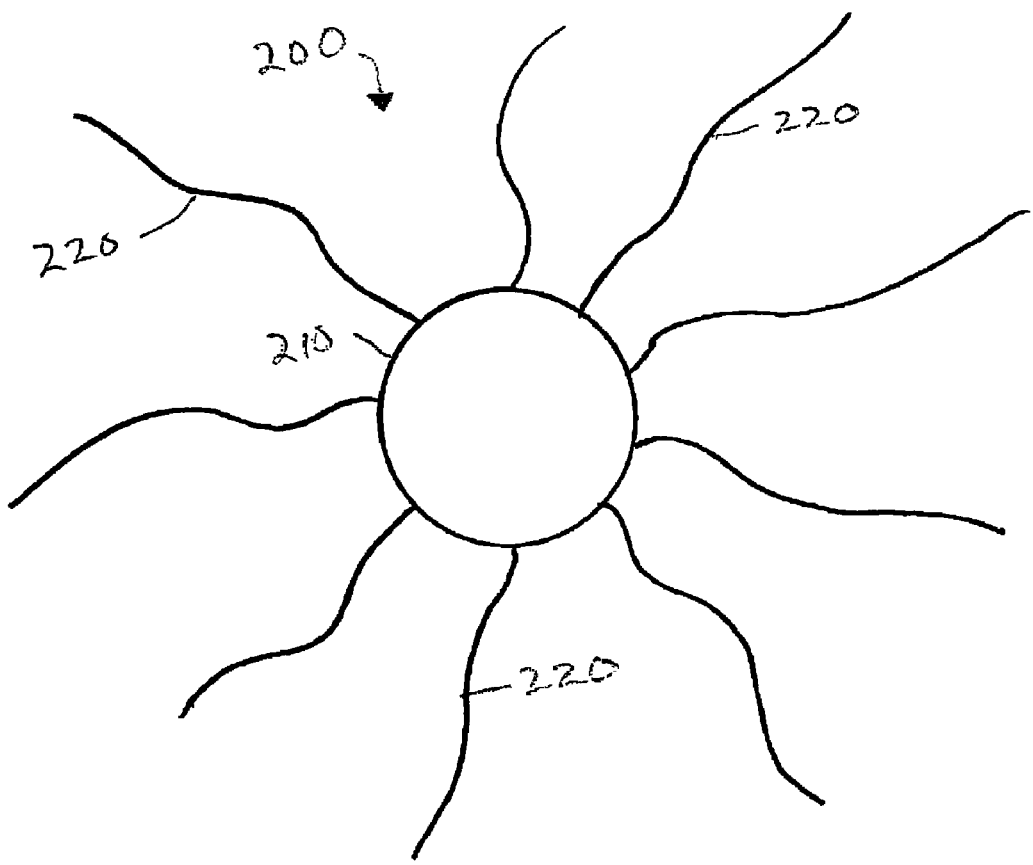
FIG. 2 is a schematic illustration of a cross-section of a chopped ceramic fiber with nanofibrils extending outward from its surface.

While not wishing to be bound by theory, it is believed the wetting of the chopped ceramic fibers with the acidic solution causes the ceramic fibers to fray resulting in the formation of the nanofibrils. The nanofibrils may extend from the surface of the chopped ceramic fibers. This is schematically illustrated in FIG. 2 wherein chopped ceramic fiber 200 has a surface or core 210 with a plurality of nanofibrils extending from the surface 210. The nanofibrils may have mean lengths in the range from about 1 to about 10,000 nm, and in one embodiment in the range from about 100 to about 1000 nm. The nanofibrils may have mean diameters in the range from about 0.1 to about 2000 nm, and in one embodiment in the range from about 10 to about 200 nm. The number of nanofibrils on the surface of ceramic fibers may be in the range from about 1 to about 500 per square micron of or surface area of fiber, and in one embodiment from about 50 to about 180 per square micron. The nanofibrils may extend the surface area of the chopped ceramic fibers by up to about $10^8$ times as compared to the surface area of the chopped ceramic fiber without the nanofibrils, and in one embodiment by up to about 10,000 times, and in one embodiment by up to about 100 times, as compared to the surface area of the chopped ceramic fibers without the nanofibrils. It is believed that the nanofibrils provide an increased surface area for the chopped ceramic fibers to provide enhanced bonding between the fibers and the alumina particulates, transition metal oxide particulates, and rare earth oxide particulates.

The concentration of wetted ceramic fibers in the as-batched composition used to form the inventive reinforced ceramic refractory may be in the range from about 0.1 to about 50% by weight, and in one embodiment in the range from about 5 to about 50% by weight, and in one embodiment in the range from about 10 to about 40% by weight, and in one embodiment in the range from about 20 to about 30% by weight.

The alumina particulates may comprise a mixture of dehydrated boehmite and calcined boehmite. The weight ratio of dehydrated boehmite to calcined boehmite may be in the range from about 10:90 to about 50:50, and in one embodiment in the range from about 20:80 to about 30:70. The alumina particulates may have a mean particle size in the range from about 1 to about 4 microns, and in one embodiment in the range from about 1.7 to about 2.5 microns. The concentration of alumina particulates in the composite mixture used to form the inventive reinforced ceramic refractory may be in the range from about 10 to about 80% by weight, and in one embodiment in the range from about 40 to about 60% by weight.

The transition metal oxide particulates may have a mean particle size in the range from about 0.1 to about 10 microns, and in one embodiment in the range from about 1.0 to about 2.5 microns. The concentration of transition metal oxide particulates in the composite mixture used to form the inventive reinforced ceramic refractory may be in the range from about 0.01 to about 10% by weight, and in one embodiment in the range from about 0.1 to about 5% by weight, and in one embodiment in the range from about 0.2 to about 2%, and in one embodiment in the range from about 0.4 to about 0.8% by weight.

The rare earth oxide particulates may have a mean particle size in the range from about 0.1 to about 10 microns, and in one embodiment in the range from about 1 to about 7.5 microns. The concentration of rare earth oxide particulates in the composite mixture used to form the inventive reinforced ceramic refractory may be in the range from about 2 to about 20% by weight, and in one embodiment in the range from about 6 to about 12% by weight.

The use of the alumina aggregate is optional but when used the alumina aggregate may aid in shrink control as well as provide enhanced physical and performance properties. The alumina aggregate may have a particle size wherein up to about 35% by weight has a −28 and +65 mesh size, and in one embodiment up to about 10% by weight has a −28 and +65 mesh size. The expression "−28 and +65 mesh size" is used herein to refer to the fact that the particulates are of a sufficient size to flow through a screen with a 28 mesh size but be retained on a screen with a 65 mesh size. The alumina aggregate may have a particle size distribution wherein: from about 15 to about 85% by weight, and in one embodiment from about 40 to about 60% by weight has a −325 mesh size; from about 15 to about 85% by weight, and in one embodiment from about 40 to about 60% by weight has a mesh size of −65 and +325 mesh size. The expression "mesh size of −65 and +325" refers to the fact that the particulates are of sufficient size to pass through a screen with a mesh size of 65 but be retained by a screen with a mesh size of 325. The expression "mesh size of −325" refers to the fact that the particulates are of sufficient size to pass through a screen with a mesh size of 325. The alumina aggregate may comprise alpha-alumina, gamma-alumina, eta-alumina, rho-alumina, delta-alumina, theta-alumina, or a mixture of two or more thereof. Upon sintering the alumina that is not alpha-alumina may convert to alpha-alumina. The concentration of alumina aggregate in the composite mixture used to form the inventive reinforced ceramic refractory may be up to about 99% by weight, and in one embodiment in the range from about 1 to about 99% by weight, and in one embodiment in the range from about 10 to about 80% by weight, and in one embodiment in the range from about 20 to about 50% by weight, and in one embodiment in the range from about 5 to about 35% by weight.

The as-batched composition used to form the inventive reinforced ceramic refractory may be formed by mixing the wetted chopped ceramic fibers with the alumina particulates, transition metal oxide particulates, rare earth oxide particulates and, optionally, alumina aggregate using appropriate mixing techniques until a uniform mixture is obtained. The as-batched composition may then be placed in a mold with a desired shape and dried at a temperature in the range from about 40 to about 90° C., and in one embodiment in the range from about 65 to about 80° C., for a period of time in the range from about 1 to about 30 hours, and in one embodiment for about 16 to about 20 hours. The resulting molded composite may be removed from the mold and, optionally, further dried at a temperature in the range from about 100 to about 300° C., and in one embodiment from about 200 to about 240° C., for a period of time in the range from about 10 to about 44 hours, and in one embodiment in the range from about 18 to about 22 hours.

The molded composite may be heated or fired using the following procedure: (1) heating the composite from a temperature of about 25° C. to about 1450° C. at a rate of about 5° C. per minute over a period of about 270 to about 300 minutes, and in one embodiment about 285 minutes; (2) heating the composite from about 1450° C. to about 1550° C. at a rate of about 2° C. per minute over a period of about 40 to about 60 minutes, and in one embodiment about 50 minutes; (3) heating the composite from about 1550° C. to about 1650° C. at a rate of about 1° C. per minute over a period of about 80 to about 120 minutes, and in one embodiment bout 100 minutes; (4) heating the composite from about 1650° C. to about 1700° C. at a rate of about 0.5° C. per minute over a period of about 80 to about 120 minutes, and in one embodiment about 100 minutes, (5) holding the temperature of the composite constant at about 1700° C. for about 50 to about 70 minutes, and in one embodiment about 60 minutes; and (6) cooling the composite from about 1700° C. to about 25° C. over a period of about 700 to about 900 minutes, and in one embodiment about 800 minutes. This heating or firing procedure may be referred to as a sintering procedure.

In one embodiment, the heating or firing procedure may comprise: (1) heating the composite from about 25° C. to about 1450° C. at a rate of about 120° C. per hour over a period of about 11 to about 12 hours; (2) heating the composite from about 1450° C. to about 1550° C. at a rate of about 80° C. per hour over a period of about 1 to about 1.5 hours; (3) heating the composite from about 1550° C. to about 1650° C. at a rate of about 60° C. per hour for about 1.5 to about 2 hours; (4) heating the composite from about 1650° C. to about 1700° C. at a rate of about 20° C. per hour over a period of about 2 to about 3 hours; (5) holding the composite at a temperature of about 1700° C. for about 0.5 to about 1.5 hours; and (6) cooling the composite from about 1700° C. to about 25° C. over a period of about 23 to about 24 hours.

Examples 1-9

The following Examples 1-9 are examples of reinforced ceramic refractories within the scope of the invention. The refractories are made using the as-batched compositions shown in Table 1 and the procedure discussed below. The numerical values in Table 1 are in parts by weight.

TABLE 1

|  | 1 | 2 | 3 | 4 | 5 | 6 | 7 | 8 | 9 |
|---|---|---|---|---|---|---|---|---|---|
| Almatis Alpha bond 300 | 23.70 | 23.70 | 11.61 | 5.57 | 18.03 | 16.09 | 16.20 | 9.02 | 21.60 |
| Almatis A1000SG | 55.30 | 55.30 | 27.10 | 12.99 | 46.97 | 41.91 | 37.80 | 23.49 | 50.40 |
| $Pr_6O_{11}$ | 6.67 | 6.67 | 4.09 | 2.81 | 6.67 | 6.67 | 5.00 | 3.34 | 6.67 |

TABLE 1-continued

|                     | 1     | 2     | 3    | 4    | 5     | 6     | 7     | 8     | 9     |
|---------------------|-------|-------|------|------|-------|-------|-------|-------|-------|
| $Y_2O_3$            | 0.33  | 0.33  | 0.20 | 0.14 | 0.33  | 0.33  | 0.25  | 0.17  | 0.33  |
| Nextel XN740 Fiber  | 14.00 | 14.00 | 7.0  | 3.50 | 28.00 | 35.00 | 15.75 | 14.00 | 21.00 |
| Alumina Aggregate   | —     | —     | 50.0 | 75.0 | —     | —     | 25.0  | 50.0  | —     |

Almatis Alphabond 300 is a product of Almatis, which is in the form of particulate solids, and is identified as being a binder containing about 88% by weight aluminum oxide. The aluminum oxide is believed to be in the form of dehydrated boehmite. The particulate solids are ground to a median particle size of 4-8 microns.

Almatis A1000SG is a product of Almatis, which is in the form of particulate solids, and is identified as being calcined boehmite. These particulate solids are ground to a median particle size of 1.5 microns.

$Pr_6O_{11}$ is in the form of particulate solids. These particulate solids are ground to a median particle size of 2.5 microns.

$Y_2O_3$ is in the form of particulate solids. These particulate solids are ground to a median particle size of 1.2 microns.

Nextel XN 740 Fibers are chopped ceramic fibers supplied by 3M. These fibers have an $Al_2O_3$ content that is in excess of 99% by weight, a level of gamma crystallinity in excess of 50% by weight, and a level of alpha crystallinity that is less than 5% by weight. The fibers have median diameters of 7-13 microns. The fibers used in Examples 1 and 5-9 have median lengths of 1.5 inches (3.8 cm). The fibers used in Examples 2-4 contain a mixture of fiber lengths wherein 10% by weight have a median length of 1.0 inch (2.54 cm), 50% by weight have a median length of 0.5 inch (1.3 cm), 30% by weight have a median length of 0.25 inch (0.64 cm), and 10% by weight have a median length of 0.125 inch (0.318 cm).

The reinforced ceramic refractories for Examples 1-9 are prepared using the following procedure.

Part 1. The Almatis A1000SG and one-half of the Almatis Alphabond 300 are mixed in a bottle. The bottle is closed and shaken vigorously. The particulate solids are removed from the bottle and placed in a plastic bowl and mixed with a wire whip at speed 2. The wire whip is made by Kitchen Aid. Speed 2 corresponds to 120 revolutions per minute (rpm). The $Pr_6O_{11}$ and $Y_2O_3$ particulate solids are added to the Almatis A1000OSG and Almatis Alphabond 300 particulate solids. The resulting mixture of particulate solids is mixed with the wire whip at speed 1. Speed 1 corresponds to 60 rpm. Mixing is continued until a uniform mixture of particulate solids is formed.

Part 2. The Nextel Fibers, which are in the form of bundles, are separated. An aqueous solution containing 95.54% by weight distilled water, 3.82% by weight $HNO_3$ and 0.64% by weight Darvan C is dripped slowly on to the Nextel Fibers over a period of 5-20 minutes to provide wetted fibers.

Part 3. The particulate solids mixture from Part 1 and alumina aggregate (if used) are added to the wetted fibers from Part 2 with stirring using the wire whip. The wire whip speed is 1. As the particulate solids are added, dry particulates that form on the bottom are stirred to the top. The wire whip speed is increased to 2 as the particulate solids blend with the wetted fibers and Alumina Aggregate. After the particulate solids, wetted fibers and Alumina Aggregate are blended together, the remainder of the Almatis Alpha Bond 300 is added. The mixing speed of the wire whip is 2 or 3, the mixing speed being sufficient to blend the additional amount of Almatis Alphabond 300 into the mixture of particulate solids, wetted fibers and Alumina Aggregate. A wire whip speed of 3 corresponds to 180 rpm. The resulting mixture is poured into molds, with about 500 grams of the mixture in each mold.

Part 4. While in the molds the mixtures are dried in air at 130° F. (54.4° C.) for 4-8 hours. The resulting molded composites are then removed from the molds and dried at 130° F. (54.4° C.) for 24-48 hours.

Part 5. The molded composites from Part 4 are fired to provide the desired reinforced ceramic refractories. The firing process involves the steps of (1) heating the composite from a temperature of 25° C. to 1450° C. at a rate of 5° C. per minute over a period of 285 minutes, (2) heating the composite from 1450° C. to 1550° C. at a rate of 2° C. per minute over a period of 50 minutes, (3) heating the composite from 1550° C. to 1650° at a rate of 1° C. per minute over a period of 100 minutes, (4) heating the composite from 1650° C. to 1700° C. at a rate of about 0.5° C. per minute over a period of about 100 minutes, (5) holding the temperature of the composite constant at 1700° C. for 60 minutes, and (6) cooling the composite from 1700° C. to 25° C. over a period of about 800 minutes.

Figure 5:
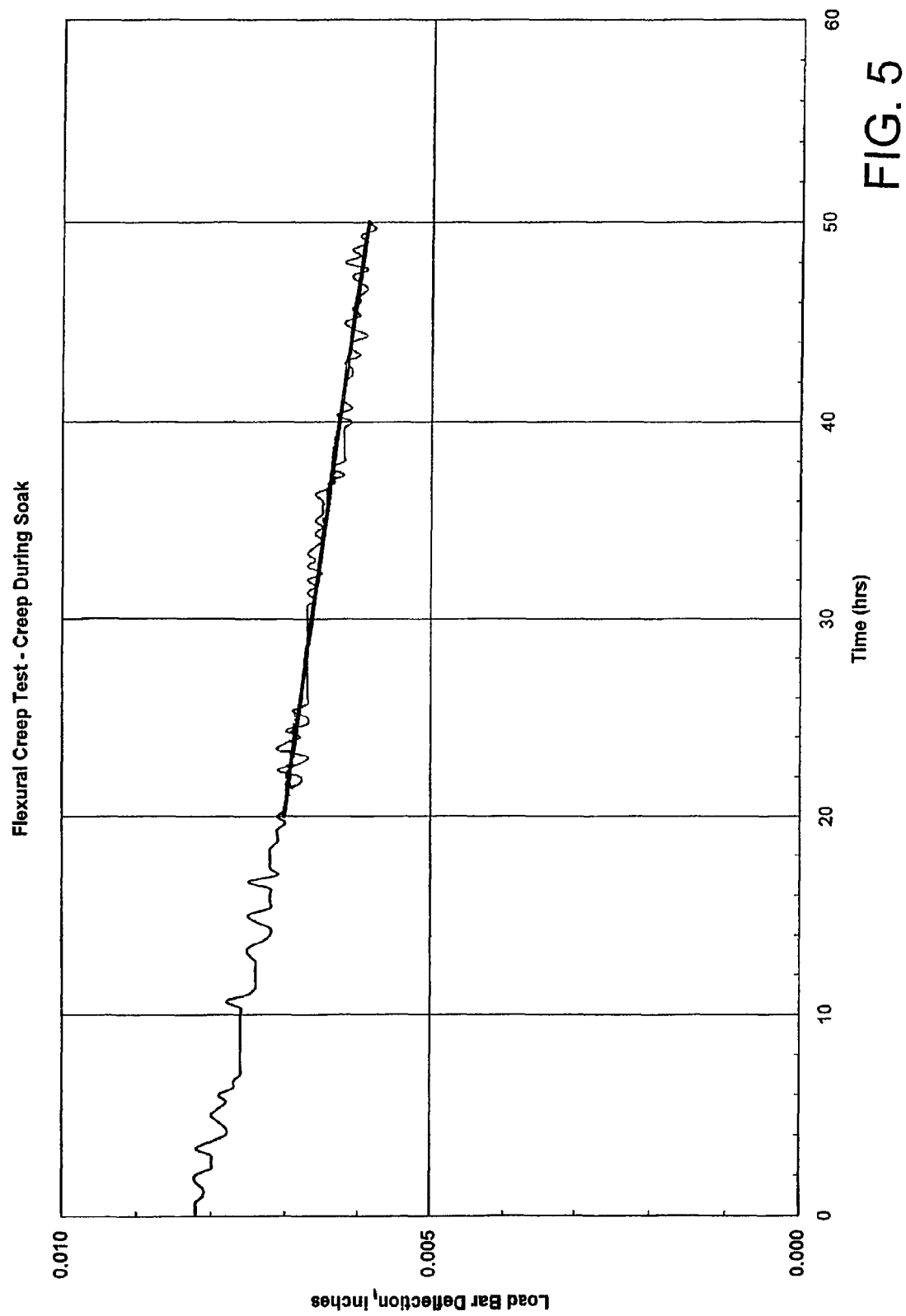
FIG. 5 is a plot of flexural creep for a reinforced ceramic refractory sample from Example 3 as disclosed in Table 2.
Figure 6:
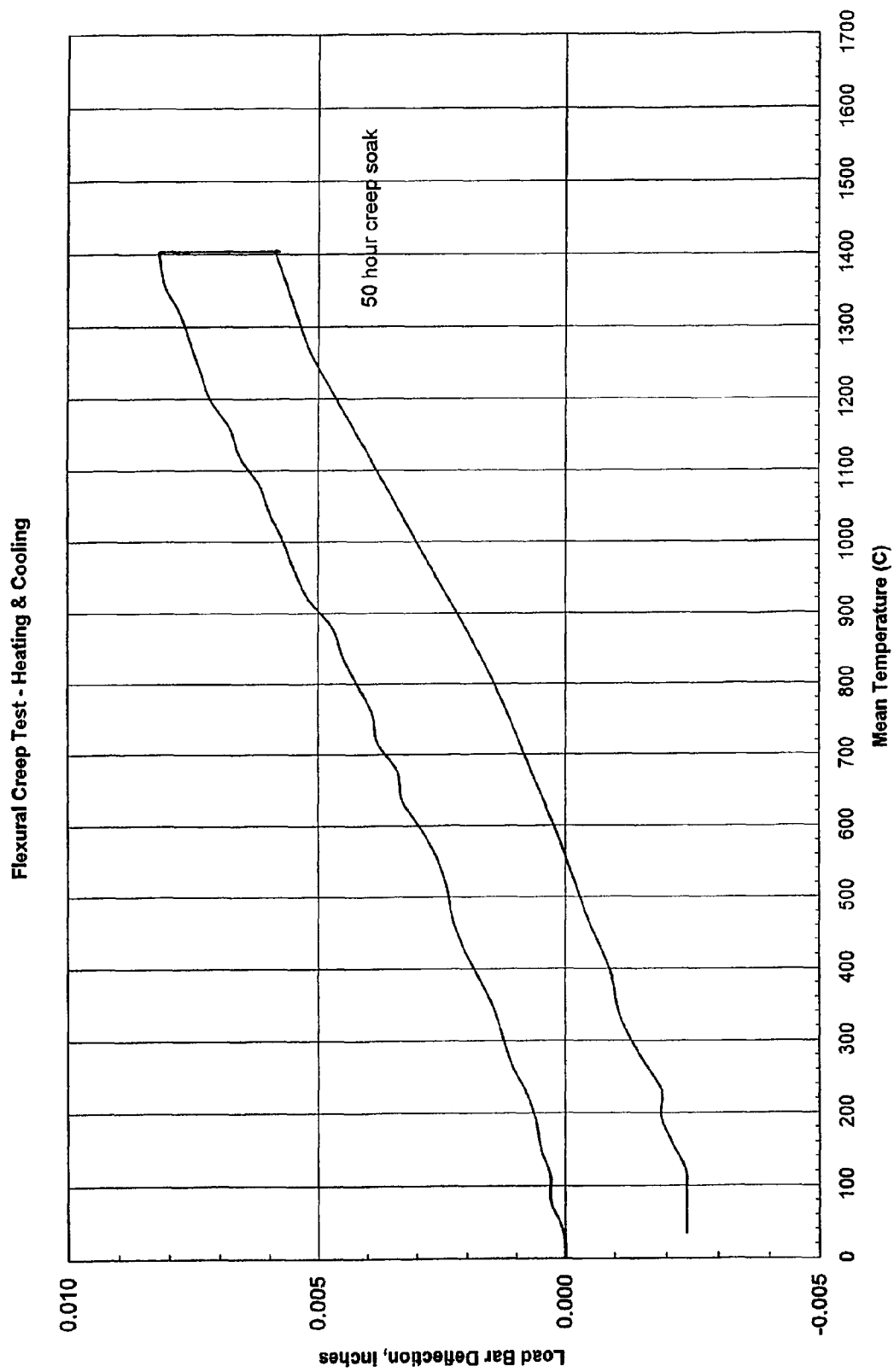
FIG. 6 is a plot of the heating and cooling curve for the flexural creep test of a reinforced ceramic refractory sample from Example 3 as disclosed in Table 2.
Figure 7:
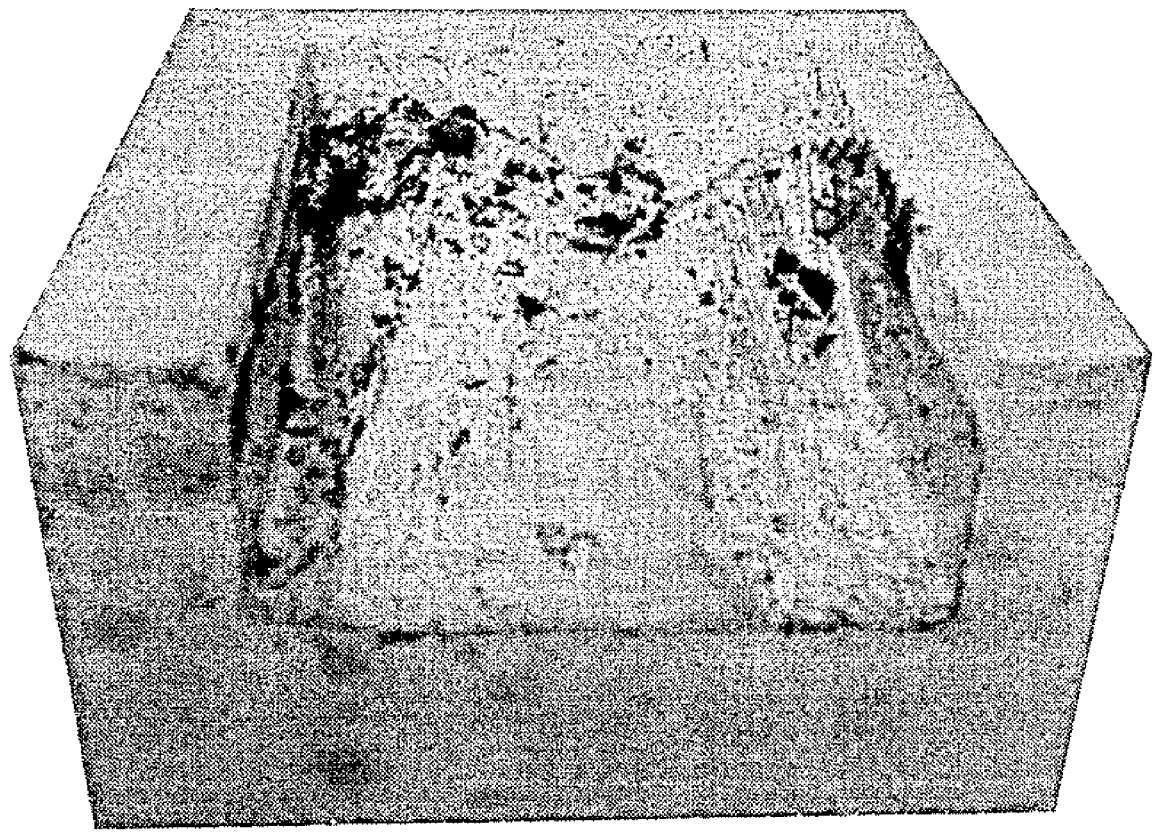
FIG. 7 is a photograph of a sample of the reinforced ceramic refractory from Example 13 positioned in a 7075 aluminum alloy structure.

Samples from Examples 2 and 3 are tested for flexural creep with a three point flexural creep test using a furnace and a laser extensometer. The samples are in the form of bars. Both faces of each sample are ground flat and parallel. The load rods are 0.5 inch (1.27 cm) alumina with flats 0.125 inch (0.318 cm) wide contacting the sample. The results are disclosed in Table 2. The results for Example 3 are shown in FIGS. 5 and 6.

TABLE 2

|                                                                 | Example 2              | Example 3             |
|-----------------------------------------------------------------|------------------------|-----------------------|
| Density (pcf)                                                   | 184.6                  | 171.2                 |
| Stress applied cold (psi)                                       | 30                     | 30                    |
| Creep temperature (° C.)                                        | 1400                   | 1400                  |
| Sample size (inches)                                            | 0.635 × 0.653 × 5.72   | 0.823 × 0.778 × 6.60  |
| Lower span (inches)                                             | 4.0                    | 4.0                   |
| Maximum Dilation (Expansion)                                    |                        |                       |
| Temperature (° C.)                                              | 1403                   | 1397                  |
| Expansion (inches)                                              | 0.007                  | 0.008                 |
| Incremental Irreversible Linear Changes                         |                        |                       |
| 20-50 hour point-point change                                   |                        |                       |
| inches                                                          | −0.0014                | −0.0012               |
| inches per hour                                                 | −0.00005               | −0.00004              |
| 20-50 hour regression                                           |                        |                       |
| inches per hour                                                 | −0.00004               | −0.00004              |
| Total Irreversible Linear Changes                               |                        |                       |
| Deformation from post-test measurement (inches)                 | −0.003                 | −0.003                |
| Heating to maximum temperature* (inches)                        | 0.000                  | 0.000                 |
| During 50 hour creep hold** (inches)                            | −0.004                 | −0.002                |

TABLE 2-continued

|  | Example 2 | Example 3 |
| --- | --- | --- |
| Total (inches) | −0.004 | −0.002 |
| Final temperature (° C.) | 40 | 34 |
| Linear change (inches) | −0.003 | −0.002 |

*Peak change on heating minus change at soak start.

**Change as maximum temperature is reached minus change after 50 hours of creep.

Samples from Examples 2-6 are tested for cold crushing strength and modulus of rupture (MOR) using test method ASTM C133. The samples from Examples 2-4 are tested for MOR with the results being shown in Table 3. These samples are in the form of ceramic bars. The span is 3 inches (7.62 cm) and the load rate is 0.05 inch/minute (0.127 cm/minute).

TABLE 3

| Example | Sample | Breadth, (in.) | Depth, (in.) | Max Load, (lbs) | Room Temp. Modulus of Rupture, (psi) |
| --- | --- | --- | --- | --- | --- |
| 2 | A | 0.701 | 0.561 | 326.6 | 6662 |
| 2 | B | 0.700 | 0.561 | 354.4 | 7239 |
|  |  |  |  | Average | 6950 |
|  |  |  |  | Std Dev. | 408 |
| 3 | A | 0.812 | 0.812 | 599.4 | 5038 |
| 3 | B | 0.812 | 0.812 | 699.8 | 5882 |
|  |  |  |  | Average | 5460 |
|  |  |  |  | Std Dev. | 597 |
| 4 | A | 0.933 | 0.906 | 989.9 | 5817 |
| 4 | B | 0.933 | 0.906 | 1054.2 | 6194 |
|  |  |  |  | Average | 6005 |
|  |  |  |  | Std Dev. | 267 |

The samples from Examples 5 and 6 are tested for room temperature cold crushing strength. The results are shown in Table 4. These samples are in the form of ceramic cubes. The load rate is 2734 lbs/min (1240 Kg/min). The load pads are ¼ inch (0.635 cm) masonite and the stress rate is 1951.

TABLE 4

| Example | Sample | Breadth, (in.) | Depth, (in.) | Max Load, (lbs) | Room Temp. Cold Crush Strength, (psi) |
| --- | --- | --- | --- | --- | --- |
| 5 | A | 1.171 | 1.197 | 18542 | 13228 |
| 5 | B | 1.217 | 1.202 | 21622 | 14781 |
| 5 | C | 1.220 | 1.230 | 33282 | 22179 |
| 5 | D | 1.249 | 1.242 | 19720 | 12712 |
| 5 | E | 1.239 | 1.263 | 16965 | 10841 |
| 5 | F | 1.245 | 1.239 | 17244 | 11179 |
|  |  |  |  | Average | 14153 |
|  |  |  |  | Std Dev. | 4185 |
| 6 | A | 1.270 | 1.257 | 3833 | 2401 |
| 6 | B | 1.276 | 1.219 | 5374 | 3455 |
| 6 | C | 1.303 | 1.247 | 4345 | 2674 |
| 6 | D | 1.243 | 1.285 | 4567 | 2859 |
|  |  |  |  | Average | 2847 |
|  |  |  |  | Std Dev. | 447 |

Samples from Examples 1 and 5-9 are tested for apparent porosity using boiling water. The results are shown in Table 5.

TABLE 5

| Example | Dry Wt (D), (g) | Suspd Wt (S), (g) | Satd Wt (W), (g) | Appt. Por., (%) | Water Abspn., (%) | Specific Gravity, (g/cc) | Bulk Density, (pcf) |
| --- | --- | --- | --- | --- | --- | --- | --- |
| 1 | 117.0 | 87.3 | 122.1 | 14.66 | 4.36 | 3.939 | 209.9 |
| 5 | 257.9 | 192.2 | 275.9 | 21.51 | 6.98 | 3.925 | 192.4 |
| 6 | 107.3 | 80.5 | 118.2 | 28.91 | 10.16 | 4.004 | 177.7 |
| 7 | 84.5 | 62.4 | 95.0 | 32.21 | 12.43 | 3.824 | 161.8 |
| 8 | 115.3 | 86.4 | 133.1 | 38.12 | 15.44 | 3.990 | 154.1 |
| 9 | 269.2 | 201.3 | 287.2 | 20.95 | 6.69 | 3.965 | 195.6 |

Examples 10-16

The following Examples 10-16 are examples of reinforced ceramic refractories within the scope of the invention. The refractories are made using the as-batched compositions shown in Table 6 and the procedure discussed below.

TABLE 6

|  | 10 | 11 | 12 | 13 | 14 | 15 | 16 |
| --- | --- | --- | --- | --- | --- | --- | --- |
| Almatis Alpha bond 300 | 18.03 | 18.18 | 18.18 | 18.18 | 18.18 | 18.18 | 18.18 |
| Almatis A1000SG | 46.97 | 43.62 | 8.72 | 15.39 | 14.54 | 8.72 | 11.56 |
| $Pr_6O_{11}$ | 6.67 | 7.31 | 7.31 | 7.31 | 7.31 | 7.31 | 7.31 |
| $Y_2O_3$ | 0.33 | 0.36 | 0.36 | 0.36 | 0.36 | 0.36 | 0.36 |
| Nextel XN740 Fiber | 28.00 | 30.53 | 30.53 | 28.00 | 28.00 | 28.00 | 28.0 |
| Alumina Aggregate | — | — | 34.90 | 30.76 | 31.61 | 37.43 | 34.59 |

The alumina aggregate for Example 12 contributes 28.36% by weight with a −325 mesh size and 6.54% by weight with a −65 mesh size. The alumina aggregate for Example 13 contributes 15.38% by weight with a −325 mesh size and 15.38% by weight with a −65 mesh size. The alumina aggregate for Example 14 contributes 14.54% by weight with a −325 mesh size, 14.54% by weight with a −65 mesh size and 2.53% by weight with a −28 mesh size. The Alumina Aggregate for Example 15 contributes 6.54% by weight with a −325 mesh size, 28.36% by weight with a −65 mesh size and 2.53% by weight with a −28 mesh size. The Alumina Aggregate for Example 16 contributes 11.53% by weight with a −325 mesh size, 11.53% by weight with a −65 mesh size and 11.53% by weight with a −28 mesh size.

The reinforced ceramic refractories for Examples 10-16 are prepared using the following procedure.

Part 1. The Nextel XN 740 fibers are fluffed for 75 seconds and then wetted by dripping an aqueous mixture containing 95.54% by weight distilled water, 3.82% by weight nitric acid and 0.64% by weight Darvan C on to the fibers to form wetted fibers.

Part 2. Add half the Almatis Alphabond 300, half the Almatis A1000SG, and all of the $Pr_6O_{11}$, $Y_2O_3$ and the alumina aggregate to an Eirich mixer. Mix for 5 minutes at 20 Hz. Stop and scrape the mixer drum and sides. Mix for 5 more minutes at 20 Hz.

Part 3. The wetted fibers From Part 1 are added to the mixture of particulate solids from Part 2 over a period of 20 minutes with mixing. After the addition of the wetted fibers is complete, the overall mixture is mixed for an additional 5 minutes.

Part 4. The remainder of the Almatis Alphabond 300 and the Almatis A 1000SG is added to the mixture from Part 3. The resulting mixture is mixed for 2-5 minutes. The mixture is placed in molds to form molded parts.

Part 5. The molded parts are covered for with a plastic bag for at least eight hours.

Part 6. The plastic bag is removed and the molded parts are allowed to air-dry in the mold.

Part 7. The molded parts are removed from the mold and allowed to air-dry before being placed in a dryer at 107° C. The molded parts are left in the dryer until the weight loss has reached 12.1% by weight.

Part 8. The molded parts are fired to provide the desired reinforced ceramic refractory. The firing process involves the steps of (1) heating the molded parts from a temperature of 25° C. to 1450° C. at a rate of 5° C. per minute over a period of 285 minutes, (2) heating from 1450° C. to 1550° C. at a rate of 2° C. per minute over a period of 50 minutes, (3) heating from 1550° C. to 1650° at a rate of 1° C. per minute over a period of about 100 minutes, (4) heating from 1650° C. to 1700° C. at a rate of 0.5° C. per minute over a period of 100 minutes, (5) holding the temperature constant at 1700° C. for about 60 minutes, and (6) cooling from 1700° C. to 25° C. over a period of 800 minutes.

Refractory samples from Example 13 after firing undergo a linear shrinkage that is 13.2 to 13.4%. This large linear shrinkage may be a result of the presence of the Nextel XN 740 fibers. The fibers are believed to act as a firing or sintering aid. It is believed that the presence of the fibers contributes to the formation of a tightly bonded polycrystalline microstructure which creates a surface that is impervious to the penetration of molten metals such as aluminum and steel.

Figure 3:
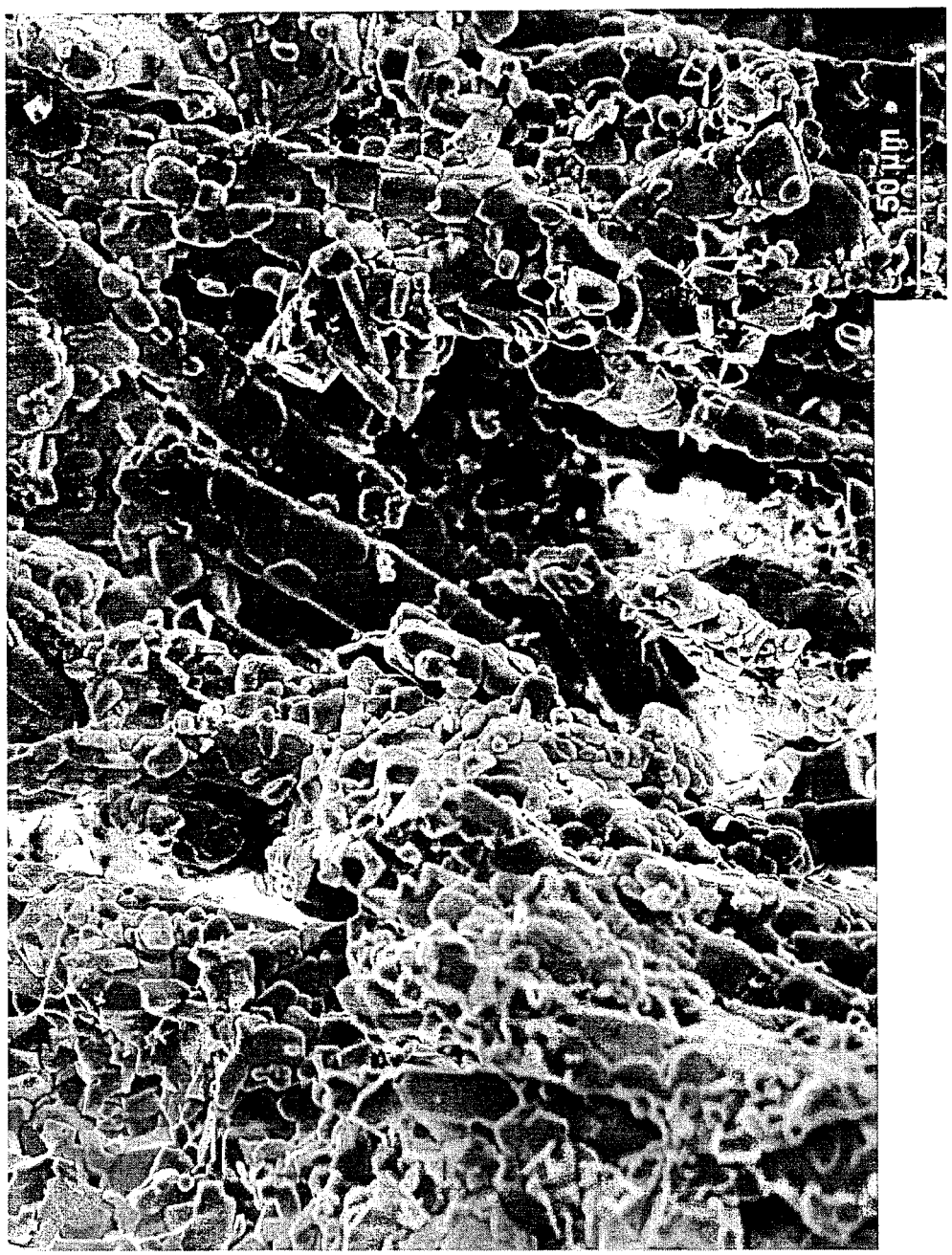
FIG. 3 is a scanning electron microscope micrograph of the fracture surface of a test sample from Example 13 using a magnification of 500×.
Figure 4:
FIG. 4 is a backscattered electron microscope image of the fracture surface of a test sample from Example 13 using a magnification of 2000×.

A refractory sample from Example 13 is analyzed using scanning electron microscope equipped with an energy dispersive spectroscopy attachment. This is shown in FIG. 3. The microstructure provided in FIG. 3 at a magnification of 500× shows a fine grain polycrystalline microstructure and the remnants of the Nextel XN 740 fibers. With the high temperature firing of this material, the Nextel XN 740 fibers are recrystallized and intimately bonded into the microstructure. The fracture mode shows a combination of inter-granular and trans-granular fracture. The Nextel XN 740 fibers are bonded to the fine grain size matrix. The grain size is between 5 microns and 30 microns. The image provided in FIG. 4 at a magnification of 2000× shows the polycrystalline nature of the sample.

Samples from Example 13 are tested for cold crushing strength and modulus of rupture using test method ASTM C133 and the results are shown in Tables 7 and 8. The samples have a density of 212.0 pounds per cubic foot (3.4 g/cc) and contain 28 wt % of the Nextel XN 740 fiber. The samples for cold crushing strength are in the form of ceramic cubes. The load rate is 0.05 inch/min. The load pads are ¼ inch (0.635 cm) masonite. The values for cold crushing strength are shown in Table 7.

TABLE 7

| Example | Sample | Breadth, (in.) | Depth, (in.) | Maximum Load, (lbs) | Room temperature Cold crushing Strength, (psi) |
|---|---|---|---|---|---|
| 13 | A | 0.738 | 0.763 | 16953 | 30107 |
| 13 | B | 0.744 | 0.748 | 15700 | 28212 |
| 13 | C | 0.759 | 0.764 | 19004 | 32772 |
| 13 | D | 0.749 | 0.766 | 19693 | 34325 |
| 13 | E | 0.759 | 0.760 | 17601 | 30513 |
| 13 | F | 0.745 | 0.760 | 18152 | 32059 |
| 13 | G | 0.726 | 0.760 | 17962 | 32554 |
| 13 | H | 0.750 | 0.759 | 18316 | 32175 |
| | | | | Average | 31590 |
| | | | | Std Dev. | 1895 |

The values for modulus of rupture for Example 13 are shown in Table 8 below. The samples are in the form of ceramic bars. The span is 3.5 inches (8.89 cm) and the load rate is 0.05 inch/minute (0.127 cm/minute).

TABLE 8

| Example | Sample | Breadth, (in.) | Depth, (in.) | Maximum Load, (lbs) | Room temperature Modulus of rupture, (psi) |
|---|---|---|---|---|---|
| 13 | A | 0.764 | 0.763 | 850.3 | 10037 |
| 13 | B | 0.764 | 0.762 | 392.0 | 4639 |
| 13 | C | 0.765 | 0.762 | 867.2 | 10250 |
| 13 | D | 0.747 | 0.764 | 529.3 | 6373 |
| 13 | E | 0.753 | 0.759 | 482.3 | 5837 |
| 13 | F | 0.749 | 0.758 | 691.3 | 8433 |
| 13 | G | 0.700 | 0.759 | 752.9 | 9802 |
| 13 | H | 0.751 | 0.758 | 840.9 | 10231 |
| | | | | Average | 8200 |
| | | | | Std Dev. | 2265 |

Samples from Examples 2 and 13 are tested for hot modulus of rupture (MOR). The test method is ASTM C583. This test covers determination of the high-temperature modulus of rupture of refractory brick or monolithic refractories in an oxidizing atmosphere and under action of a force or stress that is increased at a constant rate. The test temperature is either 1500° F. (816° C.) or 2500° F. (1371° C.) and the time is 12 hours. The results are compared to values for commercially available refractories at the indicated temperatures. The results are shown in Table 9.

TABLE 9

| Sample | Test Temperature, ° F. | Hot Modulus of Rupture, psi |
|---|---|---|
| 2A | 1500 | 4313 |
| 2B | 1500 | 5296 |
| | Average | 4805 |
| Commercial 82% alumina refractory | 1500 | 2200 |
| Commercial 94% alumina refractory | 1500 | 1900 |
| 13A | 2500 | 2701 |
| 13B | 2500 | 2755 |
| 13C | 2500 | 2822 |
| 13D | 2500 | 3265 |
| 13E | 2500 | 3375 |
| | Average | 2984 |
| Commercial 90% alumina refractory | 2700 | 1200 |

A test brick made according to Example 13 is tested in an aluminum cup penetration test with 7075 alloy at 1500° F. for 72 hours (3 days). An analysis of the 7075 alloy is taken before and after the test to determine the levels of pick-up for silicon and iron. The aluminum penetration test specifies that the pick-up of silicon should be less than 0.5 wt % and of iron should be less than 0.1 wt %. The pick-up of silicon for Example 13 is 0.023% and there is no pick-up of iron. The results are shown in Table 10.

TABLE 10

| Element Analysis | Alloy Specification | Metal analysis before test, % | Metal analysis after test, % |
|---|---|---|---|
| Si | 0.5 max | 0.046 | 0.069 |
| Fe | 0.7 max | 0.12 | 0.12 |
| Mg | 2.1-2.9 | 2.29 | 1.2 |

TABLE 10-continued

| Element Analysis | Alloy Specification | Metal analysis before test, % | Metal analysis after test, % |
|---|---|---|---|
| Ti | 0.2 max | 0.023 | 0.023 |
| Cu | 1.2-2.0 | 1.58 | 1.59 |
| Mn | 0.3 max | 0.014 | 0.015 |
| Zn | 5.1-6.1 | 5.55 | 5.67 |
| Cr | 0.18-0.4 | 0.19 | 0.20 |

Samples from Examples 12 and 13 are tested for abrasion resistance using the test method specified in ASTM C704. The results are shown in Table 11.

TABLE 11

| Example | Lgth,* (in.) | Bdth,* (in.) | Depth,* (in.) | Wt,* (grms) | Bulk Density, (g/cc) | Final Wt, (grms) | Abrasion Loss** (cc) |
|---|---|---|---|---|---|---|---|
| 12 | 5.059 | 2.491 | 0.511 | 279.4 | 2.65 | 264.3 | 11.41 |
| 13 | 5.054 | 2.484 | 0.685 | 361.7 | 2.57 | 343.2 | 7.21 |
| | | | | Avg | 2.61 | Avg | 9.31 |

*Initial values
**Sample weight loss/sample bulk density

Samples from Example 13 are tested for thermal diffusivity, bulk density and specific heat. Thermal diffusivity (a) is measured using a laser flash method. Bulk density (d) value is determined from the diffusivity sample's geometries and masses. Specific heat ($c_p$) values are measured using a differential scanning calorimeter and thermal conductivity (λ) is calculated as a product of these quantities, i.e., $\lambda = adc_p$.

Thermal diffusivity is determined using the laser flash diffusivity method. In the flash method (ASTM E1461), the front face of a small disc-shaped sample is subjected to a short laser burst and the resulting rear face temperature rise is recorded and analyzed. The apparatus consists of Korad K2 Laser, a high vacuum system including a bell jar with windows for viewing the sample, a tantalum or stainless steel tube heater surrounding a sample holding assembly, a thermocoule or an i.r. detector, appropriate biasing circuits, amplifiers, A/D converters, crystal clocks and a microcomputer based digital data acquisition system capable of accurately taking date in the 40 microsecond and longer time domain. The computer controls the experiment, collects the data, calculates the results and compares the raw data with the theoretical model.

Specific heat is measured using a standard Perkin-Elmer Model DSC-2 Differential Scanning Calorimeter with sapphire as the reference material (ASTM E1269). The standard and sample are subjected to the same heat flux as a blank and the differential powers required to heat the sample and standard at the same rate are determined using the digital data acquisition system. From the masses of the sapphire standard and sample, the differential power, and the known specific heat of sapphire, the specific heat of the sample is computed. The experimental data are visually displayed as the experiment progresses. All measured quantities are directly traceable to NBS standards.

A Netzsch Model 404 differential scanning calorimeter (DSC) is used to measure specific heats from 323 to 1673° K in a 99.999% Argon atmosphere. Energetics of transformations and reactions can also be determined over the temperature range of 296° K to 1773° K. The system is vacuum tight and therefore samples can be tested under pure inert, reducing or oxidizing atmospheres as well as under vacuum.

The dimensions and masses of the specimens used for the thermal diffusivity measurements are given in Table 12. Two different samples are measured over two temperature intervals—the first from room temperature (RT) to 900° C. and the second from 900° C. to 1600° C. Average RT density value is d=(3.232±0.005) g/cm³.

The specific heat results are given in Table 13. The specific heat values are measured from RT to 1000° C. Data up to 1600° C. are extrapolated. Total expanded uncertainty (coverage factor k=2) of the specific heat measurement is ±3%.

Thermal diffusivity results are listed in Table 14. The sample surfaces are sprayed with a thin layer of black paint in order to prevent the laser beam penetration and to increase the emissivity of the sample. Total expanded uncertainty (k=2) of the thermal diffusivity measurement is ±3%.

Figure 8:
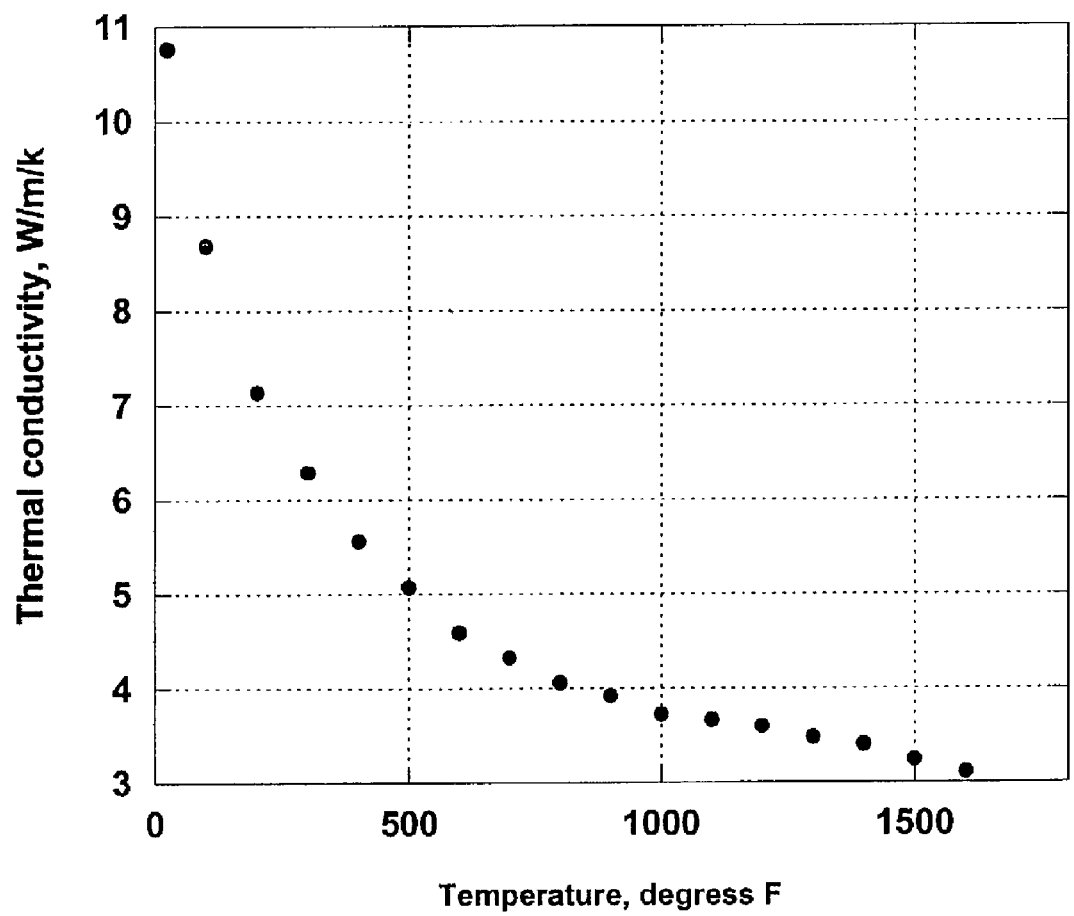
FIG. 8 is a plot of the thermal conductivity results disclosed in Table 6.

The thermal conductivity calculation results are listed in Table 15. Room temperature density value is used in calculations also for higher than RT temperatures. Total compound expanded (k=2) uncertainty of the thermal conductivity determination is ±7%. The thermal conductivity values shown in Table 15 are plotted in FIG. 8. The thermal conductivity values for Example 5, Samples A and B, are measured at 212° F. (100° C.) and have the values of 7.249 and 7.135 W/m/K, respectively.

TABLE 12

Sample Dimensions, Masses and Density Values

| Sample ID | Thickness (cm) | Width/Diam (cm) | Length (cm) | Mass (g) | Density (g/cm³) |
|---|---|---|---|---|---|
| S | 0.2516 | 1.261 | 1.259 | 1.2896 | 3.229 |
| T | 0.1536 | 0.974 | | 0.3703 | 3.236 |

TABLE 13

Specific Heat Results

| T/C. | CP/(J/g K) |
|---|---|
| 23 | 0.740 |
| 100 | 0.862 |
| 200 | 0.967 |
| 300 | 1.043 |
| 400 | 1.089 |
| 500 | 1.129 |
| 600 | 1.154 |
| 700 | 1.182 |
| 800 | 1.207 |
| 900 | 1.225 |
| 1000 | 1.250 |
| 1100 | 1.271 |
| 1200 | 1.293 |
| 1300 | 1.311 |
| 1400 | 1.332 |
| 1500 | 1.354 |
| 1600 | 1.375 |

TABLE 14

Thermal Diffusivity Results

| T/C. | a/(cm²/s) |
|---|---|
| 23 | 0.0450 |
| 100 | 0.0312 |
| 200 | 0.0228 |
| 300 | 0.0187 |
| 400 | 0.0158 |
| 500 | 0.0139 |
| 600 | 0.0123 |
| 700 | 0.0113 |
| 800 | 0.0104 |
| 900 | 0.0099 |
| 1000 | 0.0092 |
| 1100 | 0.0089 |
| 1200 | 0.0086 |
| 1300 | 0.0082 |
| 1400 | 0.0079 |
| 1500 | 0.0074 |
| 1600 | 0.0070 |

TABLE 15

Thermal Conductivity Results

| T/C. | λ(W/cm/K) |
|---|---|
| 23 | 0.1076 |
| 100 | 0.0869 |
| 200 | 0.0714 |
| 300 | 0.0629 |
| 400 | 0.0556 |
| 500 | 0.0507 |
| 600 | 0.0459 |
| 700 | 0.0432 |
| 800 | 0.0406 |
| 900 | 0.0392 |
| 1000 | 0.0372 |
| 1100 | 0.0366 |
| 1200 | 0.0359 |
| 1300 | 0.0347 |
| 1400 | 0.0340 |
| 1500 | 0.0324 |
| 1600 | 0.0311 |

The inventive reinforced ceramic refractory disclosed herein has excellent resistance to molten metal penetration, good abrasion resistance, high strength and retention of strength at elevated temperatures which is superior to other refractories having a composition which is greater than 90% alumina. The inventive reinforced ceramic refractory also has good abrasion resistance. These properties make the inventive reinforced ceramic refractory suitable for any application requiring high strength at elevated temperatures. The inventive reinforced ceramic refractory may be used as the refractory lining for an aluminum crucible or furnace.

While the invention has been explained in relation to various embodiments, it is to be understood that modifications thereof may become apparent to those skilled in the art upon reading the specification. Therefore, it is to be understood that the scope of the invention described herein is intended to include all modifications that are within the scope of the appended claims.

The invention claimed is:

1. A reinforced ceramic refractory made from an as-batched composition comprising: alumina; a rare earth oxide; an oxide of a transition metal comprising Sc, Zn, Ga, Y, Cd, In, Sn, Tl or a mixture of two or more thereof; and chopped ceramic fibers containing nanofibrils, the chopped ceramic fibers having an alumina content of at least about 95% by weight; the refractory exhibiting a modulus of rupture measured at 2500° F. (1371° C.) of at least about 2500 psi.

2. The refractory of claim 1 wherein the refractory exhibits a room temperature cold crushing strength of at least about 8,000 psi.

3. The refractory of claim 1 wherein the chopped ceramic fibers comprise strands of ceramic fiber chopped to a median length in the range from about 0.1 to about 5 cm, and having a median diameter in the range from about 1 to about 50 microns.

4. The refractory of claim 1 wherein the as-batched composition comprises alumina particulates, the alumina particulates comprising dehydrated boehmite and calcined boehmite.

5. The refractory of claim 1 wherein the as-batched composition further comprises alumina aggregate wherein up to about 35% by weight of the aluminum aggregate comprises particles of sufficient size to pass through a screen with a mesh size of 28 but retained by a screen with a mesh size of 65, from about 15 to about 85% by weight of the aluminum aggregate comprises particles of sufficient size to pass through a screen with a mesh size of 65 but retained by a screen with a mesh size of 325, and from about 15 to about 85% by weight of the aluminum aggregate comprises particles of sufficient size to pass through a screen with a mesh size of 325.

6. The refractory of claim 1 wherein the rare earth oxide comprises an oxide of Pr, La, Ce, Nd, Pm, Sm, Eu, Gd, Tb, Dy, Ho, Er, Tm, Yb, Lu, or a mixture of two or more thereof.

7. The refractory of claim 1 wherein the rare earth oxide comprises $Pr_6O_{11}$, and the transition metal oxide comprises $Y_2O_3$.

8. The refractory of claim 1 wherein the refractory has: a thermal diffusivity in the range from about 0.02 to about 0.005 cm²/sec; or a thermal conductivity in the range from about 0.1 to about 0.02 W/cm° K; or a specific heat capacity in the range from about 0.8 to about 1.4 Cp/(J/g° K); or a density in the range from about 3 to about 3.5 g/cm³; or an abrasion resistance in the range from about 3 to about 18 cubic centimeters; or a room temperature modulus of rupture in the range from about 5000 to about 9000 psi; or an apparent porosity in the range from about 5 to about 40% by weight; or a modulus of rupture measured at 1500° F. (816° C.) in the range from about 3000 to about 10000 psi; or a specific gravity in the range from about 3.2 to about 5; or the refractory exhibits a difference in modulus of rupture between an uncycled specimen and specimens subjected to thermal cycling in the range from about 400 to about 8000 psi.

9. A process for making a reinforced ceramic refractory, comprising:
  wetting chopped ceramic fibers with an acidic solution for an effective period of time to form wetted chopped ceramic fibers containing nanofibrils, the chopped ceramic fibers having an alumina content of at least about 95% by weight;
  mixing the wetted chopped ceramic fibers with alumina particulates, particulates of an oxide of a transition metal comprising Sc, Zn, Ga, Y, Cd, In, Sn, Tl, or a mixture of two or more thereof, and particulates of a rare earth oxide to form an as-batched composition; and
  drying the as-batched composition and heating the as-batched composition at a sufficient temperature for an effective period of time to form the reinforced ceramic refractory.

10. The process of claim 9 wherein the chopped ceramic fibers comprise strands of ceramic fiber chopped to a median length in the range from about 0.1 to about 5 cm, and having a median diameter in the range from about 1 to about 50 microns.

11. The process of claim 9 wherein the nanofibrils extend the surface area of the chopped ceramic fibers by at least about 100 times the surface area of the chopped ceramic fiber without the nanofibrils.

12. The process of claim 9 wherein the rare earth oxide comprises an oxide of Pr, La, Ce, Nd, Pm, Sm, Eu, Gd, Tb, Dy, Ho, Er, Tm, Yb, Lu, or a mixture of two or more thereof.

13. The process of claim 9 wherein the rare earth oxide comprises $Pr_6O_{11}$, and the transition metal oxide comprises $Y_2O_3$.

14. The process of claim 9 wherein the as-batched composition further comprises alumina aggregate.

* * * * *